United States Patent Office 3,461,184
Patented Aug. 12, 1969

3,461,184
PROCESS FOR THE PRODUCTION OF OLEFIN CODIMERS FROM ALKYL ALUMINUM CHLORIDES
Russell G. Hay, Gibsonia, and John G. McNulty and William L. Walsh, Glenshaw, Pa., assignors to Gulf Research & Development Company, Pittsburgh, Pa., a corporation of Delaware
No Drawing. Filed Dec. 15, 1966, Ser. No. 601,866
Int. Cl. C07c 3/18, 3/56, 11/00
U.S. Cl. 260—683.15
16 Claims

ABSTRACT OF THE DISCLOSURE

The process comprises treating an alkyl aluminum chloride with a first olefin having at least three carbon atoms in the molecule to form a monoaddition product thereof in the presence of a titanium chloride. After deactivation or removal of the titanium chloride, the addition product is transalkylated with a second olefin having at least two carbon atoms in the molecule, said first and second olefins having a different number of total carbon atoms per molecule. The resultant codimer olefin has a carbon number equal to the carbon number of the alkyl substitutent on said alkyl aluminum chloride plus the carbon number of said first olefin.

---

This invention relates to a process wherein an alkyl aluminum chloride is treated with a first olefin having at least three carbon atoms in the molecule to form an addition product thereof and said addition product is thereafter treated with a second olefin having at least two carbon atoms in the molecule, but whose total number of carbon atoms is different from the total number of carbon atoms in said first olefin, to form a resultant codimer olefin having a carbon number equal to the carbon number of the alkyl substituent on said alkyl aluminum chloride and the carbon number of said first olefin.

The alkyl aluminum chloride that is employed herein as the essential charge for preparing the desired codimer is one wherein the alkyl substituent has from two to 22 carbon atoms, preferably from two to 18 carbon atoms. Examples of such alkyl substituents are ethyl, propyl, butyl, isobutyl, pentyl, isopentyl, hexyl, isohexyl, heptyl, octyl, nonyl, decyl, undecyl, dodecyl, tridecyl, tetradecyl, pentadecyl, hexadecyl, heptadecyl, octadecyl, nonadecyl, eicosanyl, heneicosanyl, docosanyl, etc. The molar ratio of alkyl substituents to the chlorine substituents on said alkyl aluminum chlorides can be from about 2:1 to about 1:2, preferably from 1.7:1 to about 1:1.7. Specific examples of alkyl aluminum chlorides employed herein are ethylaluminum sesquichloride, ethylaluminum dichloride, propylaluminum sesquichloride, propylaluminum dichloride, butylaluminum sesquichloride, isobutylaluminum sesquichloride, butylaluminum dichloride, pentylaluminum sesquichloride, isopentylaluminum sesquichloride, pentylaluminum dichloride, hexylaluminum sesquichloride, hexylaluminum dichloride, heptylaluminum sesquichloride, isoheptylaluminum sesquichloride, heptylaluminum dichloride, octylaluminum sesquichloride, octylaluminum dichloride, nonylaluminum sesquichloride, nonylaluminum dichloride, decylaluminum sesquichloride, decylaluminum dichloride, undecylaluminum sesquichloride, undecylaluminum dichloride, dodecylaluminum sesquichloride, dodecylaluminum dichloride, tridecylaluminum sesquischloride, tridecylaluminum dichloride, tetradecylaluminum sesquichloride, tetradecylaluminum dichloride, pentadecylaluminum sesquichloride, pentadecylaluminum dichloride, hexadecylaluminum sesquichloride, hexadecylaluminum dichloride, heptadecylaluminum sesquichloride, heptadecylaluminum dichloride, octadecylaluminum sesquichloride, octadecylaluminum dichloride, nonadecylaluminum sesquichloride, nonadecylaluminum dichloride, eicosanylaluminum sesquichloride, eicosanylaluminum dichloride, heneicosanylaluminum sesquichloride heneicosanylaluminum dichloride, docosanylaluminum sesquichloride, docosanylaluminum dichloride, etc.

There is also employed herein in combination with the alkyl aluminum chloride defined above a selected amount of a titanium chloride. Titanium tetrachloride is preferred for this purpose. During the course of the present reaction it is believed that titanium tetrachloride is reduced to titanium trichloride in the presence of the alkyl aluminum chloride. Accordingly, if desired, titanium trichloride can be employed as such. The titanium compound is employed in amounts such that the molar ratio of the alkyl substituents on the alkyl aluminum chloride relative to the titanium compound, as titanium, is within the range of about 10:1 to about 1000:1, preferably within a range of about 200:1 to about 600:1.

In the first stage of the process the alkyl aluminum chloride, the titanium chloride and an olefin having at least three carbon atoms are brought into intimate relationship with each other. Examples of such olefins are propylene, butene-1, isobutylene, pentene-1, hexene-1, heptene-1, 2-methylpentene-1, octene-1, nonene-1, 2-methyloctene-1, decene-1, undecene-1, dodecene-1, tridecene-1, tetradecene-1, pentadecene-1, hexadecene-1, heptadecene-1, octadecene-1, nonadecene-1, eicosene-1, heneicosene-1, docosene-1, tricosene-1, tetracosene-1, pentacosene-1, hexacosene-1, etc. If desired, an inert solvent, such as diphenyl ether, ethylphenyl ether, methylphenyl ether, butylphenyl ether, dimethoxybenzene, diethoxybenzene, dibutoxybenzene, benzene, toluene, xylene, cyclohexane, heptane, hexane, pentane, chlorobenzene, dichlorobenzene, trichlorobenzene, cyclopentane, etc. can be employed to facilitate this purpose. Solvent in any amount can be employed, but for ease of operation about five to about 100 volume percent, relative to the alkyl aluminum chloride and the titanium compound is sufficient.

The above mixture is then maintained at a temperature of about 50° to about 150° C., preferably about 80° to about 130° C., and a pressure of about 0 to about 1000 pounds per square inch gauge, preferably about 50 to about 400 pounds per square inch gauge, for about one-fourth of an hour to about four hours, preferably about one-third of an hour to about two hours. As a result of such treatment one molecule of said olefin having at least three carbon atoms is inserted between an alkyl substituent and the aluminum of the alkyl aluminum chloride to form an addition product, wherein the number of carbon atoms on the resultant alkyl substituent is the sum of the alkyl substituent originally on the alkyl aluminum chloride charge and the reactant olefin.

The reaction product thus obtained is then treated in any suitable manner in order to remove or deactivate the titanium compound therein. A particularly effective method for doing this resides in treating the titanium compound with aluminum powder having an average diameter of about one to about 200 microns at a temperature of about 50° to about 150° C. and a pressure of about 0 to about 1000 pounds per square inch gauge for about one-third of an hour to about four hours.

The resulting reaction product is then treated with a second olefin having at least two carbon atoms in the molecule but different in number than the olefin employed in the first stage of the process. Any of the olefins defined above, including ethylene, can be employed. Thus, the resultant reaction product, together with the second olefin, is heated at a temperature of about 110° to about 290° C., preferably about 180° to about 250° C., and a pressure of about 0 to about 1000 pounds per square inch gauge, preferably about 0 to about 500 pounds per square inch gauge, for about one-fourth of an hour to about six hours, preferably for about one-half hour to about two hours. If desired, the total reaction product obtained from the first stage of the process, containing the deactivated titanium compound, need not be used as charge to the second stage of the process, but the alkyl aluminum chloride-olefin addition product can be removed therefrom in any convenient manner, for example, by distillation, absorption, filtration, etc. and used alone in the second stage of the process with the second olefin.

As a result of the treatment in the second stage the alkyl substituent on the alkyl aluminum chloride is removed therefrom, and replaced with, the olefin charged to the second stage of the process, resulting in an alkyl aluminum chloride, wherein the alkyl substituent corresponds to the olefin charged to the second stage of the process, and a product olefin having a carbon number equal to the carbon number of the alkyl substituent on the alkyl aluminum chloride charged to the first stage of the process and the olefin charged to the first stage of the process.

The product olefin codimer can be removed from the reaction mixture in any convenient manner. For example, the reaction mixture can be heated at a temperature of about 50° to about 290° C. and a pressure of about 10 mm. Hg to about 1000 pounds per square inch gauge for about one-third of an hour to about six hours and the product olefin can then be recovered overhead. In the event distillation is not desirable because of possible isomerization of the product olefin, the resultant mixture can be heated at a temperature of about −30° to about 100° C. and a pressure of about 0 to about 500 pounds per square inch gauge for about one-third of an hour to about six hours in the presence of molecular oxygen sufficient to convert the alkyl aluminum chloride to the corresponding alkoxide. Distillation, as defined above, can then be effected without fear of isomerization.

In a preferred embodiment the alkyl aluminum chloride is recovered from the product of the second stage of the process and recycled to the first stage of the process for reaction with the olefin charged thereto. This is illustrated below, for example, wherein it is desired to prepare 2-methyl butene-1 using propylene and ethylene as the olefin charged to the first and second stage of the process, respectively, and ethylaluminum sesquichloride as charge to the first stage of the process. It is not critical that the alkyl substituent on the alkyl aluminum chloride initially charged to the first stage of the process, in this embodiment, have a carbon number such that when added to the carbon number of the olefin charged to the first stage of the process equals in carbon number the codimer olefin desired in the second stage of the process. What is required, however, is that the sum of the carbon numbers of the olefins charged to the first and second stage of the process, respectively, be equal to the carbon number of the desired codimer olefin product. This is illustrated below, wherein it is desired to obtain 2-methyl butene-1 as set forth above.

In the first stage isobutylaluminum sesquichloride is heated, in accordance with the conditions defined above, with propylene, as a result of which a propylene molecule is inserted between the isobutyl substituent and the aluminum to form isoheptylaluminum sesquichloride. The addition product so obtained is then treated with ethylene, in accordance with the conditons defined above, as a result of which the isoheptyl group on the isoheptyl aluminum chloride is replaced with an ethyl substituent, resulting in ethylaluminum sesquichloride and 2,4-dimethyl-pentene-1. The latter codimer olefin, of course, is not desired if 2-methyl butene-1 was the compound sought to be prepared. However, the ethyl aluminum chloride obtained is recovered from the product and is employed as charge to the first stage of the process. Now when propylene is charged to the first stage of the process, isopentylaluminum sesquichloride is obtained and when the latter is treated in the second stage of the process with ethylene 2-methyl butene-1 and ethylaluminum sesquichloride is obtained. The ethylaluminum sesquichloride is then recycled to the first stage of the process and the entire operation is repeated indefinitely to obtain the desired codimer olefin and ethylaluminum sesquichloride as charge to the first stage of the process. Of course, in a preferred embodiment an alkyl aluminum chloride would be used initially wherein the alkyl substituent would correspond to the olefin charged to the second stage of the process.

In order to obtain the desired codimer product olefin, it is absolutely essential that the procedures defined hereinabove be strictly followed. In the event an aluminum trialkyl alone were employed in the first stage of the process and ethylene were employed as the reactant olefin, there would be a tendency for a large number of ethylene molecules to insert themselves between the alkyl substituent and the aluminum on the aluminum trialkyl. At the same time some of the alkyl substituents on the resulting trialkyl aluminum would be replaced with a single ethylene molecule, resulting in aluminum triethyl and a long-chain alpha olefin polymer. If a $C_3$ or higher olefin were used in place of ethylene, there would be more of a tendency to insert but one molecule of said $C_3$ or higher olefin between the alkyl substituent and the aluminum on the trialkyl aluminum. Here, too, however, simultaneously displacement of the resultant alkyl substituent with propylene or higher olefin would result. Essentially the only olefin product, then, would be a dimer of the reactant olefin. If it were desired, in such procedure, to obtain a codimer between two olefins of different carbon numbers by introducing such olefins into the reaction mixture, a mixture would be obtained. Thus, if codimer of ethylene and propylene were desired, and ethylene and propylene were introduced into the reaction zone, the resultant product would be essentially a mixture of $C_4$, $C_5$ and $C_6$ olefins.

The results obtained herein are unexpected. If ethylene is heated in the presence of an alkyl aluminum chloride and titanium tetrachloride, the resulting product is a growth product consisting of a mixed carbon number alkylaluminum chloride having a large number of carbon atoms. Under the conditions set forth herein, however, when propylene or a higher olefin is heated in the presence of the defined quantities of an alkyl aluminum chloride and titanium tetrachloride, essentially only one molecule of said olefin will find its way between the alkyl group and the aluminum. Thereafter, as pointed out above, the resultant alkyl substituent can be removed and replaced with a second olefin to form a codimer of the original alkyl substituent on the alkyl aluminum chloride and the olefin having at least three carbon atoms initially brought in contact therewith. Apparently, in the present process using an olefin having at least three carbon atoms in the molecule, the titanium chloride permits the use of a low reaction temperature to facilitate essentially the insertion of only one of said olefins between the alkyl group and the aluminum without displacing the resulting alkyl substituent therefrom. The chlorine on the alkyl aluminum chloride tends to inhibit the rapid growth of the alkyl group on the alkyl aluminum chloride and thus permits essentially the insertion of only one propylene or higher olefin between the alkyl substituent on the alkyl aluminum chloride charge to the first stage of the process and the aluminum.

The process of this invention can further be illustrated by the following:

Example I

Tridecylaluminum-diphenyl ether complex was prepared by reacting 202.0 grams of triisobutylaluminum and 285.4 grams of diphenyl ether in a dry, nitrogen-flushed flask, with 478.6 grams of decene-1 being slowly added over a period of eight hours at a temperature of 122° C. The diphenyl ether was employed in order to form a complex with the tridecylaluminum so that the tridecylaluminum could be easily and safely handled. The temperature was slowly raised to 220° C. during the next two and one-half hours to complete the reaction. Isobutylene collected from this reaction amounted to 162.5 grams. After cooling to room temperature 81.88 grams of aluminum chloride was added and equilibrated for one and one-half hours at 150° to 155° C. to give a mixture containing 56.5 mol percent monochloride and 43.5 mol percent dichloride. This was filtered through a fine fritted funnel under a nitrogen atmosphere to produce 843.5 grams of decylaluminum chloride charge for the desired reaction. The alkyl aluminum chloride-diphenyl ether was charged to an evacuated stirred autoclave where it was contacted with propylene at about 160° C. for 30 minutes, after which 1.68 cubic centimeters of titanium tetrachloride were added thereto. The propylene pressure was increased to 300 pounds per square inch gauge and the reaction temperature was held at 101° C. to 107° C. over a period of two hours. During the course of the reaction 100 grams of propylene were added to the reaction zone. 914.5 grams of the 945.9 grams of addition, or telomer product, was removed from the autoclave and reacted with 1.66 grams of active aluminum powder having an average micron size of 10 to render the titanium chloride inactive. The active aluminum powder had been prepared by dissolving 8.83 grams of aluminum chloride in 40.6 grams of diphenyl ether and then treating the reaction mixture with 8.5 grams of a 50 percent sodium sand in paraffin. The reaction product containing the active aluminum powder was added to the addition product and heated for one hour at 135° C. In order to obtain the desired product, 2-methyl dodecene-1, the addition product was transalkylated by adding thereto 757.8 grams of an olefin mixture of which 90 percent by weight thereof was octadacene. The transalkylation and distillation on a short Vigreaux column at a pot temperature of 195° C. and a head temperature of 138° C. at 30 millimeters of mercury resulted in an overhead product of 466.3 grams. This material was fractionally distilled to give 105.8 grams heart cut which was 95 to 99 mol percent 2-methyl dodecene-1. The transalkylation step was continued to a pot temperature of 238° C. with a head temperature of 182° C. at 30 millimeters of mercury pressure. The 260.8 grams of overhead material was fractionally distilled to give a 50.8 gram heart cut of $C_{13}$ olefins which were 88 to 92 percent 2-methyl dodecene-1.

Example II

Tridecylaluminum-diphenyl ether complex was prepared by reacting 97.7 grams of triisobutylaluminum, 90.15 grams of diphenyl ether, and 241.7 grams of decene-1 over a three and one-half hour period by slowly increasing the temperature from 120° to 220° C. as the evolution of isobutylene decreased. 78.5 grams of isobutylene were collected, indicating a 94.5 percent transalkylation. 40.46 grams of aluminum chloride were added and equilibrated for two hours at 135° C. The resulting aluminum alkyl consisted of 14 mol percent decylaluminum dichloride and 86 mol percent didecylaluminum chloride. The aluminum alkyl-diphenyl ether complex was filtered through a fritted disc funnel under a nitrogen atmosphere to give 370.5 grams of charge material for the telomerization reaction. This material was charged to an evacuated stirred autoclave where it was contacted with propylene at 10 pounds per square inch gauge and 48° C. for 30 minutes. A 0.81 cubic centimeter volume of $TiCl_4$ was added to give an R/Ti ratio of 200/1. Propylene was added at 250 to 300 pounds per square inch gauge and allowed to react at 105° to 109° C. while stirring over a two-hour period.

The $TiCl_4$ was then deactivated with active aluminum powder. This was prepared by dissolving 6.91 grams of $AlCl_3$ in 121.5 grams of diphenyl ether and reacting with 6.95 grams of 50 percent sodium sand in paraffin.

After adding the dispersed aluminum powder to the autoclave and stirring, the telomer product was transalkylated with propylene at 200° to 250° C. and 300 pounds per square inch gauge for two hours. The product amounting to 548.1 grams was oxidized with air and oxygen below 30° C. to form the aluminum propoxide so it would remain in the residue during the distillation. A 582.6 gram charge was distilled at 1.8 millimeter pressure with a head temperature of 86° C. and a pot temperature of 118° C. to give an overhead product of 116.4 grams. After water washing, it was fractionally distilled to give a $C_{13}$ heart cut which was redistilled on a spinning band column making 20, 2 cubic centimeter cuts. Infrared revealed the cuts contained about five percent diphenyl ether which prevented the group type analysis. Cuts 11, 12, and 13 were combined and run through a silica gel column to remove the saturates and the diphenyl ether. Analysis of this sample revealed that it contained 60 percent 2-methyl dodecene-1.

Example III

Trihexadecylaluminum-diphenyl ether complex was prepared by reacting 238.1 grams of triisobutylaluminum, 180.7 grams of diphenyl ether and 854.4 grams of hexadecene-1 in a nitrogen flushed reaction flask. The hexadecene-1 was added over an 11-hour period at 120° C. and increasing the temperature at the end to 215° C. The isobutylene collected was 148.1 grams and 97.14 grams of $AlCl_3$ was added and equilibrated at 150° C. for one and one-half hours. The transalkylated product was filtered through a fine fritted disc funnel under nitrogen atmosphere giving 1187.3 grams. A 317.1 gram portion was charged to an evacuated stirred autoclave where it was contacted with propylene at 80° C. for one hour. After saturating the aluminum alkyl-diphenyl ether complex with propylene, 0.53 cubic centimeter of $TiCl_4$ was added, making an R/Ti ratio of 200/1. Propylene was added to give a pressure of 300 pounds per square inch gauge at 109° C. while stirring for three hours. To the product was added 91.6 grams of active aluminum powder dispersion prepared by dissolving 1.44 grams of aluminum chloride in 88.1 grams of diphenyl ether and reacting with 1.45 grams of 50 percent sodium sand in paraffin. This rendered the $TiCl_4$ inactive for further telomerization. Of the 398.8 grams of product taken from the autoclave 382.3 grams were reacted with 661.5 grams of α-olefin wax bottoms ($C_{24+}$) to transalkylate the 2-methyloctadecyl chains from the aluminum atoms. While this transalkylation was taking place, the methyl-α-olefins were being distilled overhead on a glass spiral column. The first cut of 102.1 grams contained 90 percent diphenyl ether and 10 percent $C_{16}$ olefin. The second cut of 50.2 grams was 40 percent diphenyl ether and 60 percent $C_{16}$ olefin. The third cut of 47.8 grams contained 10 percent diphenyl ether and 90 percent $C_{16}$ olefin. The last cut of 43.5 grams was 40 percent $C_{19}$ olefin and 60 percent heavy material.

Example IV

Ethylaluminum sesquichloride was prepared by the reaction of 438.5 grams of triethylaluminum (dissolved in 1127.5 grams of n-heptane) with 514.3 grams of aluminum chloride. The mixture was refluxed at 106° C. for about four hours. Ethylaluminum sesquichloride (148 grams) dissolved in n-heptane (176.6 grams) was charged to an evacuated stirred autoclave where it was contacted with propylene at about 25° C. for thirty minutes, after which 0.8 cubic centimeter of titanium tetrachloride were added thereto. The propylene pressure was increased to 155 pounds per square inch gauge and the reaction temperature was held at 101° to 108° C. over a period of two hours. During the course of the reaction about twenty grams of propylene were added to the reaction zone.

Aluminum chloride (anhydrous 3.0 grams) was placed in 50 grams of n-heptane. To this mixture was added 3.0 grams of sodium sand (50 percent by weight in paraffin). The total mixture was heated to 60° to 66° C. for a period of about one hour. The total mixture of the reduced aluminum powder was added to the reaction product in the autoclave. The temperature was held at 90° C. for about one-half hour. At the end of this period, ethylene (120 to 160 pounds per square inch gauge) was added to displace the isopentyl alkyl groups as isopentene and reform ethyl groups. The eythlene was vented and the reaction mixture was then pressured with nitrogen (222 pounds per square inch gauge). Ethylene was added and the pressure increased to 350 pounds per square inch gauge for two and one-half hours. The next day nitrogen (410 pounds per square inch gauge) was added to the reaction mixture before the ethylene was added which increased the total pressure to 480 pounds per square inch gauge. The total product was transferred to a distillation flask so that the isopentene could be distilled overhead. Isopentene (14.1 grams) was obtained by distillation and analysis by gas chromatography which indicated the following isomer distribution:

| | Mol percent |
|---|---|
| 3-methylbutene-1 | 17.5 |
| 2-methylbutene-1 | 62.2 |
| 2-methylbutene-2 | 20.3 |

Obviously many modifications and variations of the invention, as hereinabove set forth, can be made without departing from the scope thereof, and therefore only such limitations should be imposed as are indicated in the appended claims.

We claim:
1. A process which comprises treating an alkyl aluminum chloride with a first olefin having at least three carbon atoms at a temperature of about 50° to about 150° C. in the presence of a titanium chloride to obtain an addition product composed of said alkyl aluminum chloride and said first olefin and thereafter treating said addition product with a second olefin having at least two carbon atoms, the number of carbon atoms in said second olefin being different from the number of carbon atoms in said first olefin, at a temperature of about 110° to about 290° C. to obtain a product containing an alkyl aluminum chloride wherein the alkyl substituent thereof has a carbon number equal to said second olefin and an olefin codimer having a carbon number equal to the sum of the carbon numbers of said first olefin and said alkyl substitutent on said alkyl aluminum chloride initially treated therewith.

2. The process of claim 1 wherein the alkyl aluminum chloride in the first stage is ethylalumiunm sesquichloride.

3. The process of claim 1 wherein the alkyl aluminum chloride is propylaluminum dichloride.

4. The process of claim 1 wherein the alkyl aluminum chloride is butylaluminum sesquichloride.

5. The process of claim 1 wherein the alkyl aluminum chloride is pentylaluminum sesquichloride.

6. The process of claim 1 wherein the molar ratio of the alkyl substituents on the alkyl aluminum chloride charge relative to the chlorine substituents thereon is from about 2:1 to about 1:2.

7. The process of claim 1 wherein the titanium chloride is titanium tetrachloride.

8. The process of claim 1 wherein the titanium chloride is titanium trichloride.

9. The process of claim 1 wherein the molar ratio of the alkyl substituents on the alkyl aluminum chloride charge relative to the titanium is within the molar range of about 10:1 to about 1000:1.

10. The process of claim 1 wherein said alkyl aluminum chloride is a straight chain alkyl aluminum chloride, said first olefin is propylene and said second olefin is ethylene.

11. The process of claim 1 wherein said alkyl aluminum chloride is a straight chain alkyl aluminum chloride, said first olefin is propylene and said second olefin is butene-1.

12. The process of claim 1 wherein said alkyl aluminum chloride is a straight chain alkyl aluminum chloride, said first olefin is butene-1 and said second olefin is hexene-1.

13. The process of claim 1 wherein said alkyl aluminum chloride is a straight chain alkyl aluminum chloride, said first olefin is propylene and said second olefin is hexene-1.

14. The process of claim 1 wherein said first olefin is propylene and said second olefin is ethylene and the alkyl aluminum chloride obtained in the second step is recycled and employed as charge in the first step of the process.

15. The process of claim 1 wherein the titanium chloride is deactivated at the end of the first step of the process.

16. The process of claim 1 wherein the titanium chloride is deactivated at the end of the first step of the process by contacting the reaction mixture with aluminum powder.

References Cited
UNITED STATES PATENTS
3,349,149  10/1967  McNulty et al.

PAUL M. COUGHLAN, Jr., Primary Examiner

U.S. Cl. X.R.
260—448